US005081602A

United States Patent [19]
Glover

[11] Patent Number: 5,081,602
[45] Date of Patent: Jan. 14, 1992

[54] COMPUTER SIMULATOR FOR ELECTRICAL CONNECTORS

[75] Inventor: Douglas W. Glover, Harrisburg, Pa.

[73] Assignee: AMP Incorporated, Harrisburg, Pa.

[21] Appl. No.: 433,634

[22] Filed: Nov. 8, 1989

Related U.S. Application Data

[63] Continuation-in-part of Ser. No. 434,063, Nov. 7, 1989, abandoned.

[51] Int. Cl.$^5$ .............................................. G06F 15/00
[52] U.S. Cl. ...................................... 364/578; 364/488
[58] Field of Search ............... 364/578, 480, 481, 488, 364/489, 490, 491, 801, 802, 580, 200, 900, 482, 483

[56] References Cited

U.S. PATENT DOCUMENTS

| | | | |
|---|---|---|---|
| 3,500,188 | 3/1970 | Whitley | 324/64 |
| 3,675,002 | 7/1972 | Mitsui et al. | 364/802 |
| 3,755,732 | 8/1973 | Couper | 324/58 |
| 3,808,409 | 4/1974 | Enns | 364/578 |
| 4,725,970 | 2/1988 | Burrows et al. | 364/578 |
| 4,791,593 | 12/1988 | Hennion | 364/578 |
| 4,792,913 | 12/1988 | Buckland et al. | 364/602 |
| 4,872,126 | 10/1989 | Premerlani et al. | 364/578 |
| 4,924,429 | 5/1990 | Kurashita et al. | 364/578 |

Primary Examiner—Parshotam S. Lall
Assistant Examiner—Michael Zanelli

[57] ABSTRACT

A computer model for an electrical connector of the type having multiple signal carrying paths utilizes both preselected, connector defining parameters which define electrical characteristics of the signal carrying paths of the electrical connector, as well as user selectable, application specific coded information that defines a set of signals and allocates each of the signals to a respective one of the signal carrying paths. The computer model models the electrical connector using the connector defining parameters to define the electrical connector and the application specific coded information to define the user selectable signals on the signal carrying paths of the electrical connector. This model can be used to investigate various pin assignments in order to optimize connector performance for an application specific set of signals. The disclosed connector model can also be incorporated into a larger model of an electronic system that includes at least one connector in order to emulate the electrical characteristics of the connector in the systems.

7 Claims, 6 Drawing Sheets

COMPUTER SIMULATOR FOR ELECTRICAL CONNECTORS

IDENTIFICATION OF RELATED APPLICATION

This application is a continuation in part of copending U.S. patent application Ser. No. 07,434,063, filed Nov. 7, 1989, now abandoned.

BACKGROUND OF THE INVENTION

A copy of the program listings are contained on 4 pages, 314 frames of microfiche film.

This invention relates to a computer simulator for electrical connectors and to a method for using such a simulator to allow a circuit designer to optimize pin selection for signals passing through the connector.

Electrical connectors have long been used in a wide variety of electronic circuits. In the past, electrical connectors have often been considered simply as an array of conductors, which do not contribute significantly to the operational characteristics of the electronic circuit in which they are used. However, as electronic switching speeds have increased, the electrical characteristics of electrical connectors have become an important part of circuit design.

The electrical characteristics of a connector are complicated by the fact that they are in part governed by the basic physical structure of the connector, but they are also in part governed by the manner in which the connector is used, and in particular by the pin selection made by the circuit designer. The selection of the geometrical arrangement of the various signals among the signal paths provided by a connector can be an important part of an overall application design for an electrical connector.

In the past, computer simulation has been widely used to simulate individual electronic components, integrated circuits, and conductors on a printed circuit board. Such computer simulation allows a designer to simulate the operation of an electronic circuit before it is actually built. This conventional type of computer simulation is not, however, well suited for simulation of electrical connectors. This is because part of the electrical characteristics of the connector are determined by the manufacturer of the connector, who determines the connector geometry, and part of the electrical characteristics of the connector are determined by the user, who determines which signals will be applied to which pins of the connector. Thus, a need presently exists for an improved computer simulator that can be used to simulate both these aspects of an electrical connector, that will allow the user to simulate an electronic circuit including an electrical connector, and that will allow the user to select pins on the connector for desired signals. Such an interactive computer simulator for an electrical connector would greatly assist a user in optimizing pin selection and in simulating a complete electronic system, including both the electronic circuits and the connectors of the system.

In the past, non-interactive calculations have been used to predict the electrical characteristics of an electrical connector. For example, equivalent circuits for individual signal paths within a connector have been determined, and matrices have been used to determine capacitance effects of one signal path on another. However, such non-interactive calculations do not allow ready examination of the effects of different pin selections on the electrical characteristics of the connector.

SUMMARY OF THE INVENTION

According to this invention, a computer model is provided for an electrical connector of the type having a plurality of signal carrying paths. This computer model comprises means for defining a plurality of preselected, connector-defining parameters which define electrical characteristics of the signal carrying paths of the electrical connector. The model also includes means for receiving application specific coded information that defines a set of signals and allocates each of the signals to a respective one of the signal carrying paths. The electrical connector is modeled using the connector defining parameters to define the electrical connector and the application specific coded information to define the user selectable signals on the signal carrying paths of the electrical connector.

The computer model of this invention allows a circuit designer to simulate an entire system (including both electrical circuits and connectors) and to explore alternative pin selection patterns for an electrical connector in order to optimize electrical performance of the connector.

This invention is also directed to a method for determining expected electrical performance characteristics of a circuit comprising at least one electrical connector comprising the step of providing a computer model for an electrical connector having a plurality of signal paths. This model has a first set of preselected, connector defining parameters which define a fixed geometry characteristic of the electrical connector, and a second set of user selectable, application specific parameters which define a plurality of signals applied to the signal carrying paths. The application specific parameters are then selected to define an initial set of signals applied to the signal carrying paths and the computer model is run to determine expected effects of the electrical connector on at least some of the initial set of signals. Then a second set of application specific parameters is selected to define another set of signals applied to the signal carrying paths, and the computer model is run to determine the expected effects of the electrical connector on at least some of the other side of signals. In many applications, the two sets of signals will comprise exactly the same signals allocated to differing signal carrying paths. In this way, a circuit designer can explore the optimum pin selection pattern to minimize undesired characteristics, such as cross talk.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
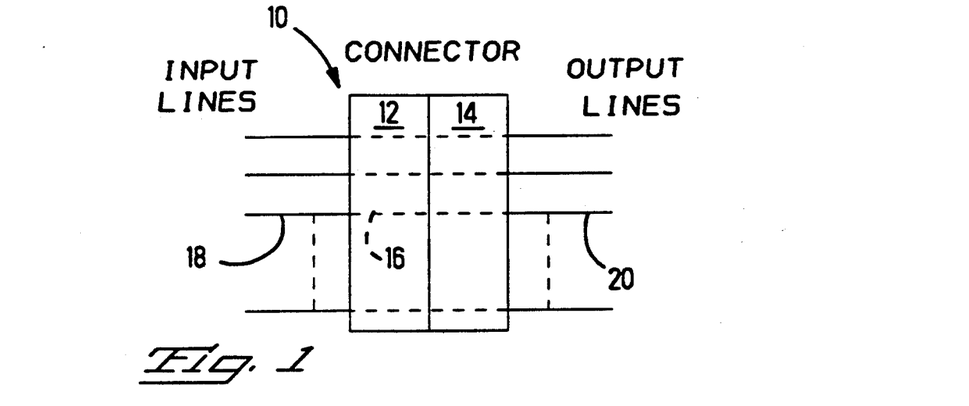
FIGURE 1 is a schematic view of a connector used to illustrate the preferred embodiment of the computer simulation method and apparatus of this invention.

Turning now to the drawings, FIG. 1 shows a schematic representation of a connector 10 that will be used for illustration in this discussion. The connector 10 can be any suitable connector, such as a right angle high density connector for connecting a daughter board to a back plane in a computer system. The connector 10 includes two connector halves 12, 14 which can be mated and separated in the usual manner. The connector 10 defines a plurality of signal carrying paths or signal paths 16 extending between respective input lines 18 and output lines 20.

Figure 2:
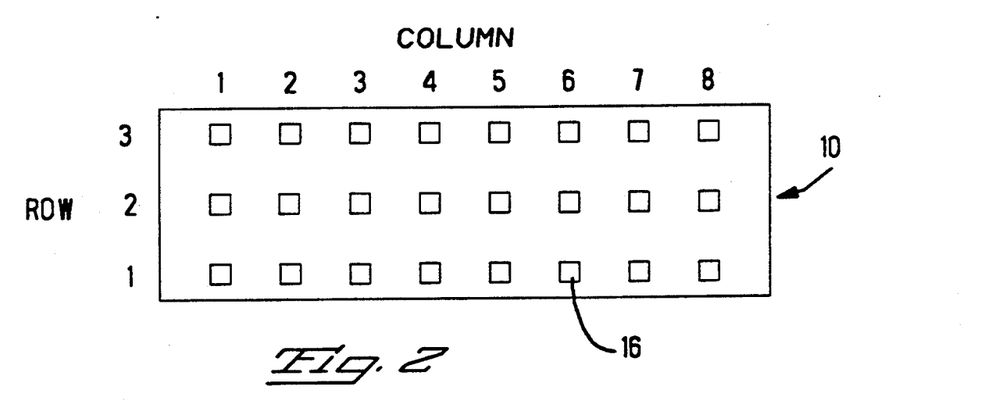
FIG. 2 is a schematic view of the connector of FIG. 1 showing pin layout.

FIG. 2 shows a schematic representation of the signal paths 16 in the connector 10, and the notation of FIG. 2 will be used in the following discussion. Note that each signal path 16 is characterized by a row and a column. The details of construction of the connector 10 form no part of this invention, and will therefore not be described in any detail. The example provided by FIGS. 1 and 2 is a relatively simple connector. It will of course be understood that the present invention can be applied to much more complex connectors if desired.

Figure 3:
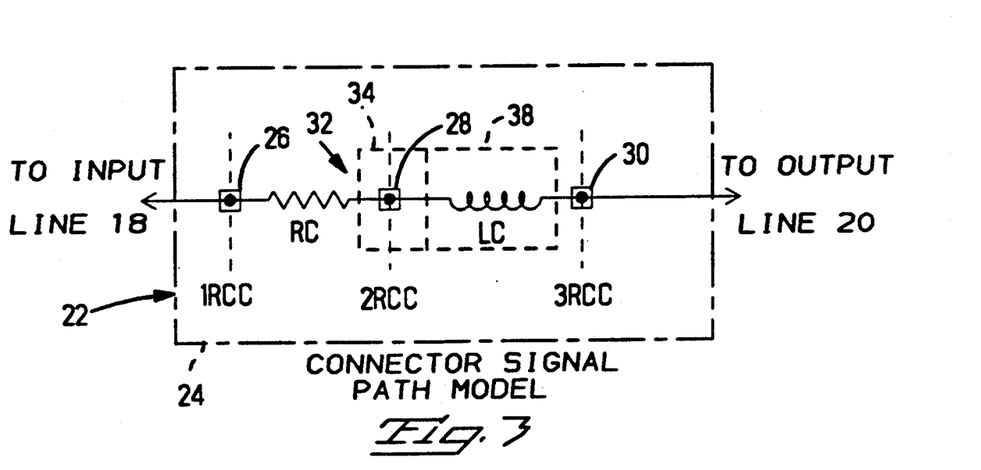
FIG. 3 is a schematic representation of a connector signal path model included in the connector model of this embodiment.

In FIG. 3, the reference numeral 22 is used to refer generally to a computer model of the connector 10 which incorporates the presently preferred embodiment of this invention. This computer model 22 can be thought of as comprising a plurality of signal path models 24, one for each of the 24 signals paths 16 of the connector 10. The signal path model 24 simulates the electrical characteristics of the connector 10 as determined by the geometry of the various conductive and non-conductive elements of the connector 10.

Each of the signal path models is organized around three respective nodes 26, 28, 30. Each node is numbered with a code number having three components. The node 26 carries the code number 1RCC, where R is the row number and CC is the column number of the respective signal carrying path 16. Similarly, the nodes 28 and 30 are identified by the code numbers 2RCC and 3RCC. For example, the signal carrying path 16 at the upper left hand corner of FIG. 2 (Row 3, Column 1) would use the following code numbers to identify the nodes 26, 28, 30: 1301, 2301, 3301.

Each signal path model 24 includes an equivalent circuit 32 for the respective signal path 16 that includes two series constants, RC and LC. RC indicates the series resistance characteristic of signal path 16, and LC indicates the inductance of the respective signal path 16. As shown, series element RC is interposed between nodes 26 and 28, and series element LC is interposed between nodes 28 and 30.

Additionally, each of the signal path models includes elements that together make up a capacitive matrix 34 and an inductive matrix 38, which will be discussed below in connection with FIGS. 4 and 5.

Figure 4:
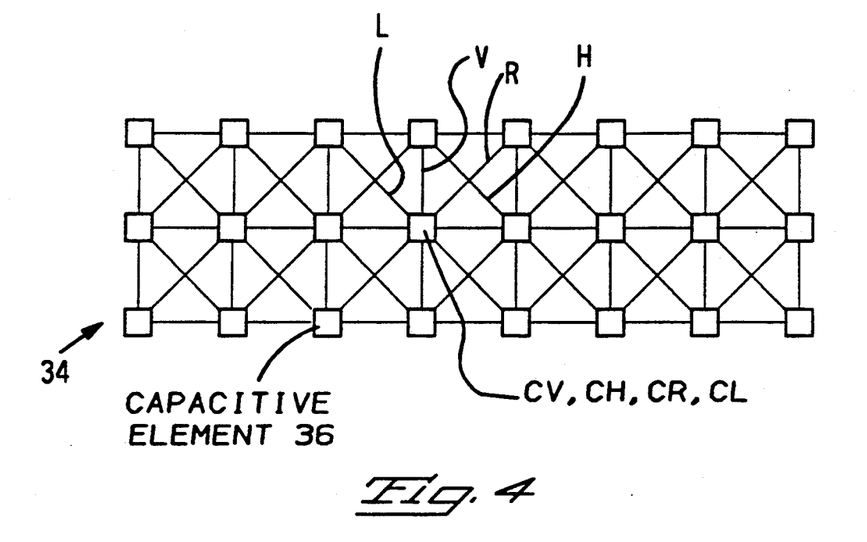
FIG. 4 is a schematic view of a capacitive matrix used in the model of FIG. 3.

FIG. 4 shows a schematic representation of the capacitive matrix 34, which is made up of an array of capacitive elements 36. Each set of capacitive elements 36 is associated with a respective pair of signal paths 16. The capacitive elements provide the capacitive coupling constant for the respective pair of signal paths.

It will be understood that the most significant capacitive coupling is between adjacent signal carrying paths. In this model, a capacitive element is provided for each pair of adjacent signal paths, as indicated schematically by horizontal, vertical and diagonal lines in FIG. 4. In this embodiment, the capacitive elements are labeled CV, CH, CR and CL. CV is indicative of the capacitive coupling constant between a signal carrying path and the signal carrying path in the same column and the next larger row, as indicated by the symbol V in FIG. 4. The capacitive element CH is indicative of the capacitive coupling constant between a signal carrying path and the adjacent path in the same row and the next larger column, as indicated by the symbol H in FIG. 4. Capacitive element CR is indicative of the capacitive coupling constant between a signal carrying path and the diagonally situated path at the next larger column and row, as indicated by the symbol R in FIG. 4. Finally, capacitive element CL is indicative of the capacitive coupling constant between a signal carrying path and the diagonally adjacent signal path having the next larger row and smaller column, as indicated by reference symbol L in FIG. 4. It will be recognized that in this example there are sixty-five pairs of adjacent conductive paths as defined above, and the computer model 22 includes sixty-five capacitive elements.

Figure 5:
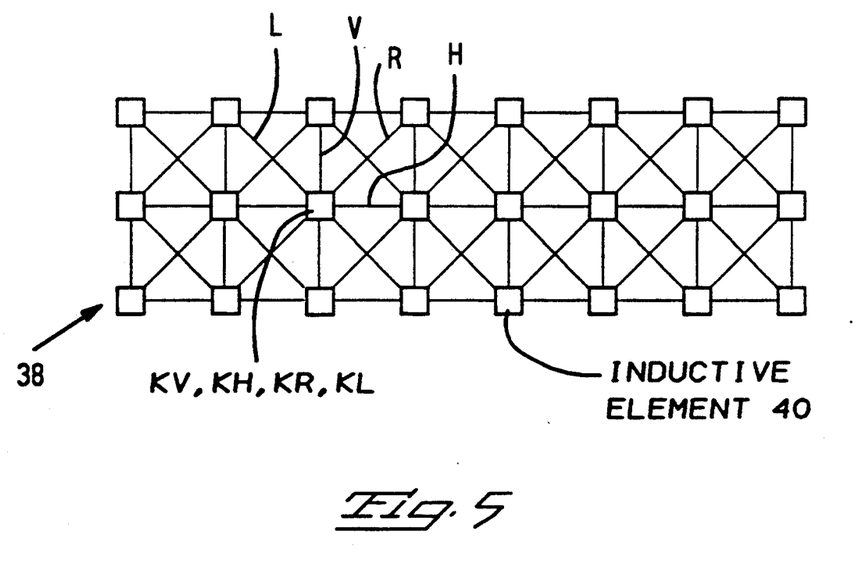
FIG. 5 is a schematic representation of an inductive matrix included in the model of FIG. 3.

The inductive matrix 36 is schematically shown in FIG. 5, and it is organized in substantially the same way as the capacitive matrix 34 discussed above. The inductive matrix 36 includes sixty-five inductive elements 40 in this example, each indicative of the mutual inductive constant between an adjacent pair of signal paths. In this embodiment, the inductive elements 40 are denoted by the symbols KV, KH, KR and KL, using the same symbols V, H, R and L as discussed above.

Table 1 provides a listing of portions of the computer model 22, and Table 1 will be used to clarify the foregoing discussion relating to the signal path model 24 of the computer model 22. In Table 1, consecutive lines are labeled with numbers between 1 and 461, and these line numbers will be used in the following discussion.

The portion of connector model 22 that specifies the connector defining parameters described above is found in Table 1 at lines 188 through 461. Lines 193 through 271 define the series elements RC, LC for each of the signal paths 16. In Table 1, rows A, B and C correspond to rows 3, 2 and 1, respectively. Each line defining one of the series elements RC, LC includes four entries. Note, for example, line 196 where the first entry (RC1101) identifies the series element being defined. The next two entries identify the nodes between which the defined series element is connected, in this example between node 1101 (node 26 of the signal path for row 1, column 1) and node 2101 (node 28 for the signal path for row 1, column 1). The fourth entry indicates the resistance ($4 \times 10^{-3}$ Ohms) for the series element RC being defined.

The notation for the inductive series elements LC is identical, except that the units of measurement for the last entry is Henries. Thus, line 197 defines the series element LC (element LC2101) as extending between nodes 28 and 30 for the signal path at row 1, column 1, and as having an inductance of $10 \times 10^{-9}$ Henries. Lines 193 through 271 define the forty-eight series elements RC, LC needed for the twenty-four separate signal paths 16 of the connector 10.

Lines 272 through 365 of Table 1 define the sixty-five capacitive elements 36 for the capacitive matrix 34 discussed above. Once again, each line contains 4 entries. The first entry defines the element being modeled, and the second and third entries define the nodes between which the element is connected in the model. The fourth element of each line defines the capacitance in Farads of the defined element. For example, in line 276 capacitive element CV2101 is defined as extending between nodes 2101 and 2201 and having a capacitance of $0.39 \times 10^{-12}$ Farads. This capacitive element CV2101 represents the capacitive coupling constant between the signal path at Row 1, Column 1, and the signal path at Row 2, Column 1. Similarly, the coupling constant defined in line 277 (CH2101) defines the coupling constant between the signal path at Row 1, Column 1 and Row 1, Column 2 as $0.45 \times 10^{-12}$ Farads. The capacitive element CR2101 defined in line 278 represents the capacitive coupling constant between signal paths at Row 1, Column 1 and Row 2, Column 2, and defines this constant as $0.20 \times 10^{-12}$ Farads.

Lines 366 through 459 define the inductive elements 40 of the inductive matrix 38 discussed above. The notation is similar to that discussed above, and the fourth entry on each line defines the ratio of current in one of the signal paths to induced current in the other. Thus, line 370 defines inductive element KV2101 (which represents the mutual inductive constant between the signal paths at Row 1, Column 1 and Row 2, Column 1) as a ratio of 0.18.

At this point, it should be emphasized that the signal path models 24 make up a connector model, and that this connector model is defined by the entries on lines 189 through 460 of Table 1. The series constants, capacitive elements and inductive elements defined here are determined by the physical geometry of the connector 10 itself and thus cannot easily be modified in a predictable way by the user. These constants are preselected constants which define the connector 10 and are outside the control of the connector user.

Of course, when installed in a circuit the connector 10 is interconnected with individual signal paths 16 carrying different types of signals. In order to properly simulate the operation of the connector 10, these interconnections must be modeled as well.

Figure 6A:
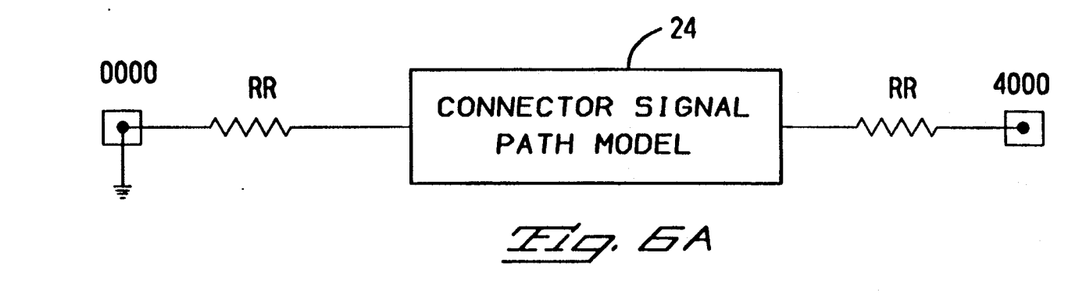
FIGS. 6a, 6b and 6c are schematic diagrams showing connector signal path models included in an interconnection model to simulate the respective signal path carrying a reference signal (FIG. 6a), used as an inactive signal carrying line (FIG. 6b), and used as an active signal carrying line (FIG. 6c).
Figure 6B:
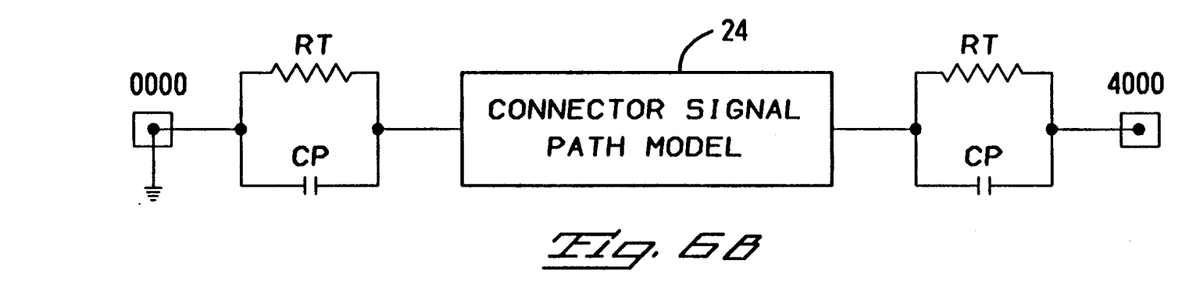
Figure 6C:
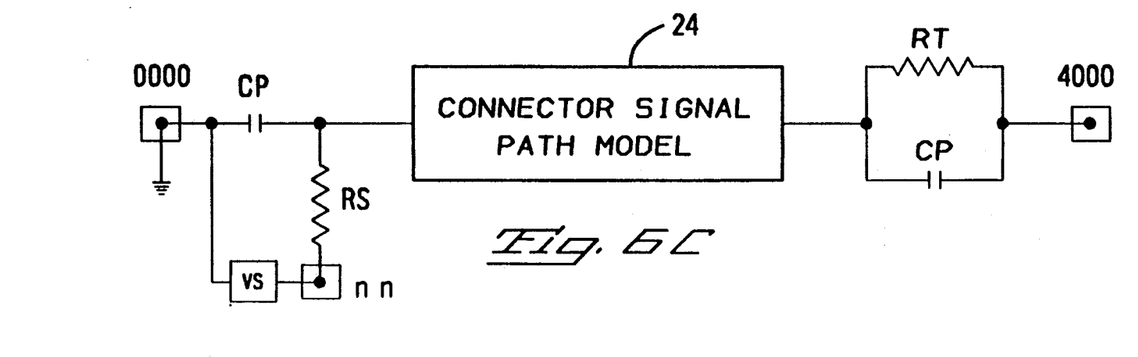

In this embodiment, each of the signal path models 24 can be interconnected either as a reference line carrying a reference signal such as a ground voltage, an inactive connected line which carries no active signal during modeling, or as an active signal carrying line which carries a signal generated by a voltage source. FIGS. 6a through 6c show these three possibilities and define certain parameters used in the example of Table 1.

If a particular signal path is being used to carry a reference voltage such as ground, that signal path is modeled as shown in FIG. 6a. The respective signal path model is connected via reference resistors RR at the input side to a ground node 0000, and at the output line to a node 4000. This reference resistance is meant to indicate a typical resistance between the respective signal path and ground and is typically made up of conductor resistances, solder joint resistances, and the like.

If a signal path is being used as a signal carrying rather than a reference path, yet is not actively carrying a signal, the respective signal path model 24 is connected as shown in FIG. 6b. The input line of the respective signal path model 24 is connected via a parallel resistance RT and capacitance CP to the ground node 0000. The resistance RT is meant to define the termination resistance of the associated transmission line, and the capacitance CP the appropriate capacitance, which is to a large extent associated with physical features such as plated through holes in a printed circuit board. Similarly, a terminating resistance RT and a capacitance CP are connected in parallel between the output line of the respective inactive line signal path model and the node 4000.

In the event a signal path is actively carrying a signal during the simulation, the respective signal path model 24 is modeled as shown in FIG. 6c as connected at its input end via a capacitance CP to the ground node 0000 and via a resistance RS to a node nn. The resistance RS is meant to simulate the source impedance. The node nn is then connected to the node 0000 via a voltage source VS. This voltage source generates a signal that is applied via the node nn and the resistor RS to the input line of the signal path model 24. The output line of the signal path model is connected via parallel resistance and capacitance elements RT, CP to the node 4000.

Thus, by allocating resistances RR to reference lines, resistances and capacitances RT, CP to inactive signal carrying lines, and resistances RS, RT, capacitances CP, and voltage sources VS to active signal carrying lines, the various signal paths 16 of the connector 10 can be modeled to simulate a particular choice of pins for the respective signals.

Figure 9:
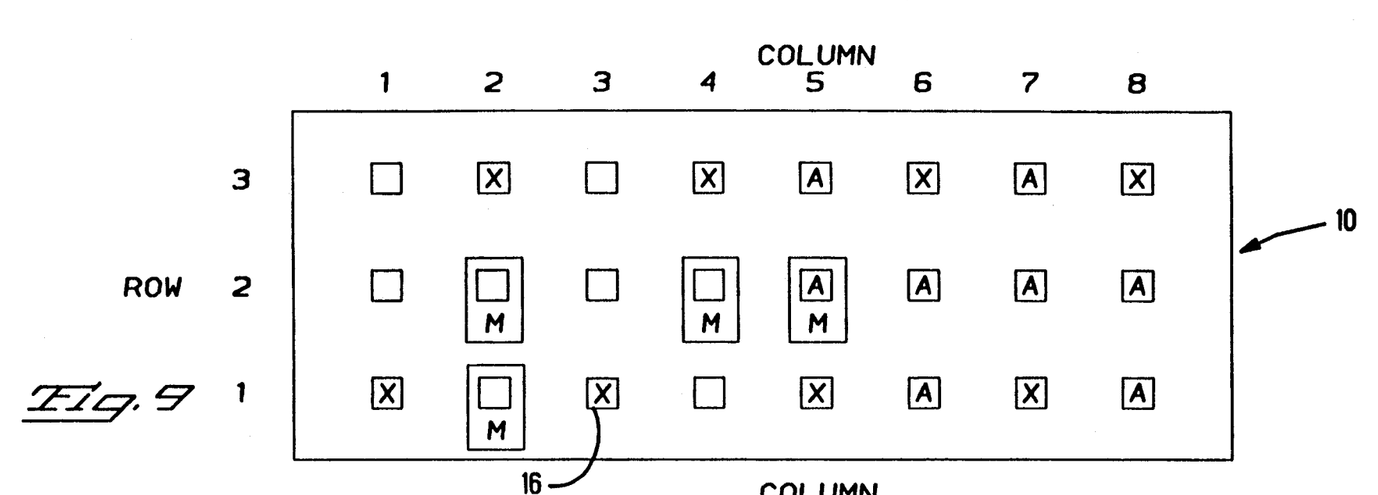
FIGS. 9 and 10 are schematic representations of the connector 10, showing two alternative pin selection patterns that can be modeled using the model of FIG. 7.

In the example of Table 1, this is done at lines 21 through 63 and lines 80–188. In Table 1 the signal paths indicated with an X in FIG. 9 are assigned as reference lines connected to ground with reference resistances RR. This is done at lines 81 through 103 of Table 1, where RR is set equal to $1 \times 10^{-6}$ Ohms in each case. In this example the signal paths indicated with the letter A in FIG. 9 are active signal carrying lines, and the signal paths which carry neither an X nor an A are inactive lines. In Table 1, lines 104 through 145 define the terminating resistances RT for the input and output sides and lines 146 through 188 define the capacitances CP for the input and output sides. Once again resistances are expressed in Ohms and capacitances in Farads.

Lines 21 through 63 define the voltage sources VS and the source impedances RS for the active lines shown in FIG. 9. Source impedances RS are defined as shown for example in line 32 as each having an identifying number (RS02 in this example) which is interconnected between two nodes (node 02 and node 26 of Row 1, Column 6) and having a resistance of 60 Ohms. Voltage supples are defined in terms of the lower and upper voltages, delay, rise time, fall time, pulse width and period. Note for example line 30 of Table 1 where voltage source VS02 is defined between the ground node 00 and node 02 as a signal making a transition from 2.0 to 4.0 volts with zero delay and a 3.0 nanosecond rise time. In this example, the signal is not periodic and fall time, pulse width and period are therefore not defined.

Figure 7:
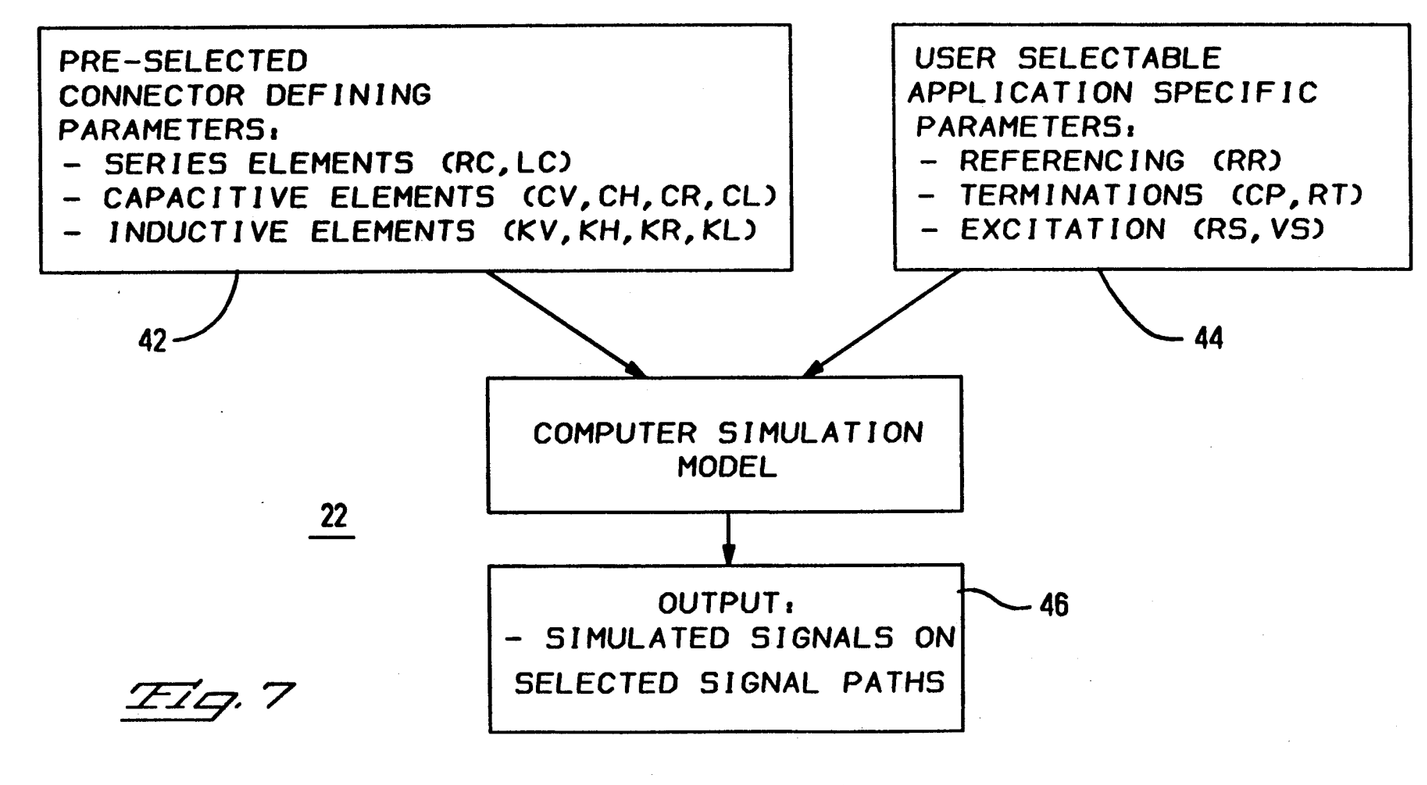
FIG. 7 is a schematic representation of the computer simulation model of this embodiment.

From this explanation it should be apparent that the circuit designer can easily select the signal paths in the connector 10 to carry selected signals by properly choosing the parameters RR, RT, CP, RS and VS. FIG. 7 shows an overview of the manner in which the computer simulation model 22 described above functions. As pointed out above, the computer simulation model 22 includes a number of preselected connector defining parameters including the series elements RC, LC, the capacitive elements CV, CH, CR, CL and the inductive elements CV, KH, KR, KL. These preselected connector defining parameters are illustrated in Table 1 at lines 189 through 460, and they define the predetermined geometry of the connector, as chosen by the connector manufacturer.

The computer simulation model 22 includes a second set of user selectable, application specific parameters that define the signals applied to the various signal paths of the connector 10. These application specific parameters include referencing parameters RR, termination parameters CP, RT, and excitation parameters RS, VS. The circuit designer can readily choose which pins are to carry which signals by appropriate selection of these application specific parameters. The computer simulation model utilizes these two sets of parameters as shown at blocks 42 and 44 to simulate the electrical characteristics of the connector, as used in the particular application being modeled. The computer simulation model 22 generates an output indicative of simulated signals on selected signal paths, as indicated at block 46 of FIG. 7. For example, the computer simulation model can be used to track voltage as a function of time on any one of the signal carrying paths of the connector 10.

The details of operation of the computer simulation model 22 do not per se form part of this invention. In this preferred embodiment the SPICE computer simulation program has been used. Those skilled in the art will recognize that a wide variety of models could be adapted for use with this invention. However, the code of Table 1 has been created for use with the SPICE computer simulation program, and a copy of the listing for this program is attached in microfiche Appendix 1. The listing of Appendix 1 is in FORTRAN source code, and can be compiled for various computers. Each sheet of the microfiche is entitled, "Computer Instructions," and includes four sheets numbered consecutively, 001-004.

Figure 8:
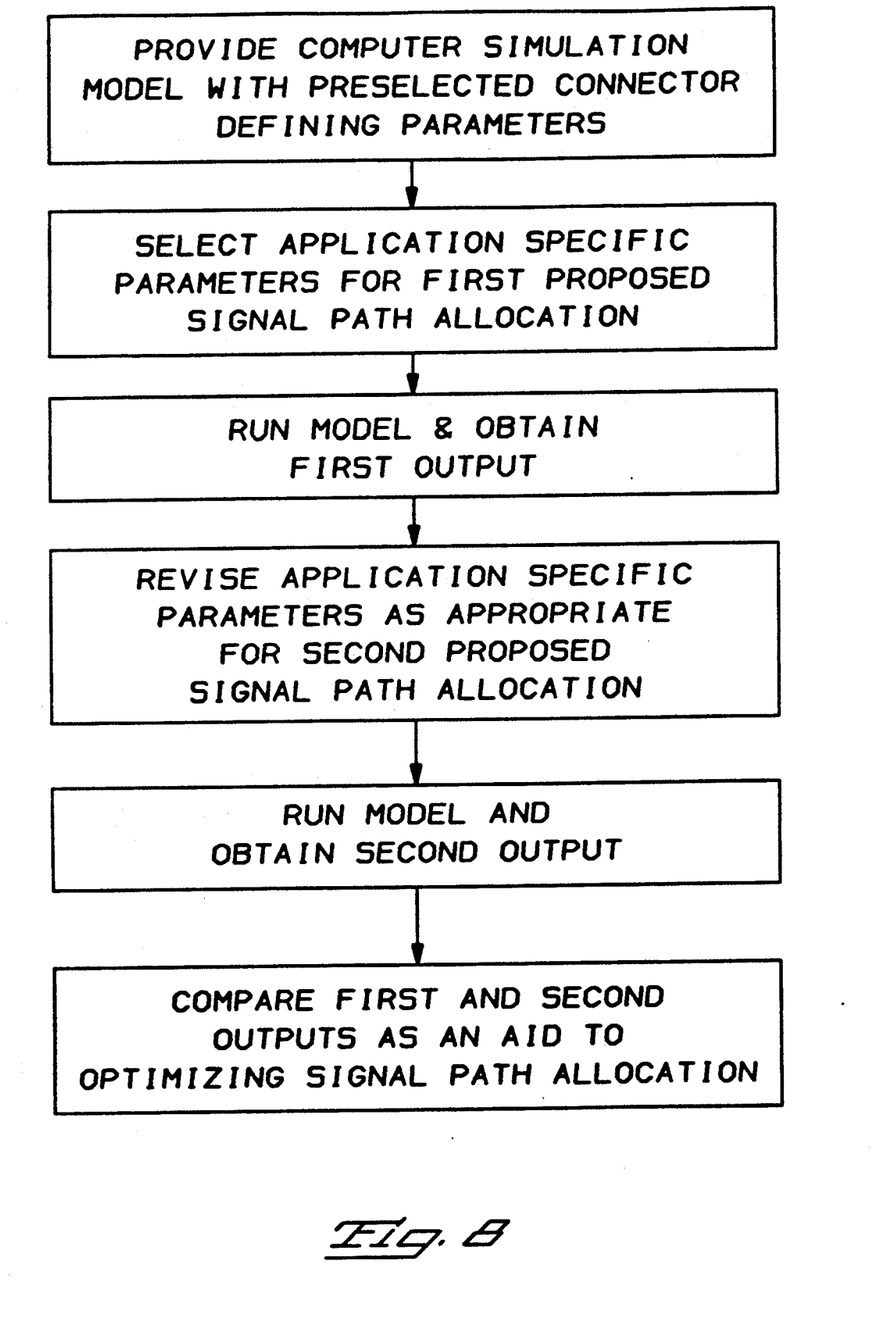
FIG. 8 is a flow chart demonstrating one method for using the computer model of FIG. 7.

FIG. 8 provides a flow chart showing how the computer simulation model 22 can be used to aid a designer in optimizing connector performance in a specific application. As a first step in the process illustrated in FIG. 8 the computer simulation model 22 is provided having preselected connector defining parameters (block 42 of FIG. 7) that characterize the physical connector being used. The user then selects application specific parameters for a first proposed signal path allocation (block 44 of FIG. 7). For example, FIG. 9 shows one such first proposed signal path allocation. As pointed out above, in FIG. 9 signal paths used to carry a reference potential are indicated with an X, signal paths that are actively carrying signals are indicated with an A, and inactive signal carrying paths are left unmarked. A box marked with the letter M is used to designate the signal paths which will be monitored, i.e, on which simulated signals will be calculated by the computer simulation model 22. Note in FIG. 9 that the reference lines are arranged in a staggered pattern on Rows 1 and 3. The user then runs the model 22 to obtain a first output indicative of the anticipated signals on the signal paths at Row 2, Columns 2, 4 and 5 and Row 1, Column 2 induced by the signals carried by the active lines.

Figure 10:
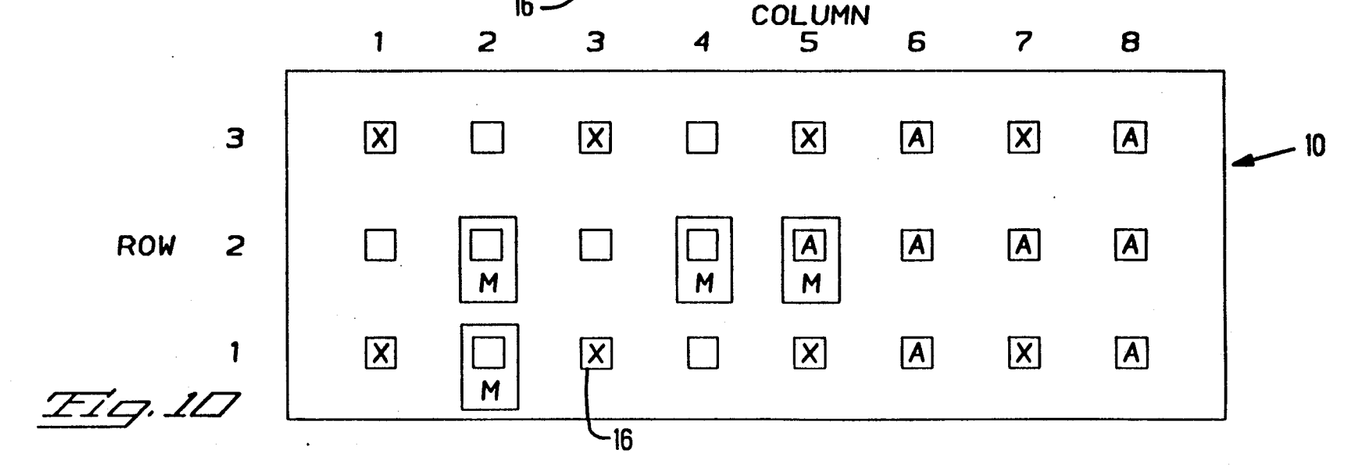

The user can then revise the application specific parameters (block 44 of FIG. 7) as appropriate for a second proposed signal path allocation. One possible alternative is illustrated in FIG. 10, where the positions of the reference lines in Row 3 have been shifted, without increasing their number. The computer simulation model 22 is then run again obtaining a second output, which in this case is the simulated signals on signal paths at Row 2, Columns 2, 4 and 5 and row 1, Column 2. The user can then compare the first and second outputs as an aid to optimizing signal path allocation.

As pointed out above, a designer can materially enhance circuit operation in modern high speed electronic circuits by properly allocating reference, active and inactive lines to appropriate signal paths in the connector. It should be apparent from the foregoing discussion that the computer model 22 can greatly assist a circuit designer in this optimization.

The connector simulation model of this invention can also be used as part of a larger computer simulation model for an entire electronic system. Such a larger model would model electronic circuits included in the system, and would use the connector model of this invention to model the electrical connectors of the system. In this way the entire system can be simulated, and the effect of electrical connectors on system operation can be predicted. When used in this way, the connector model of this invention emulates the electrical characteristics of the physical connector as incorporated in the electronic system. In such applications, the larger computer simulation model generates the application specific coded information that defines the signals applied to the connector.

Of course, those skilled in the art will recognize that this invention can be implemented using a wide variety of computer simulation programs, and it can be adapted to simulate a wide variety of connectors. Furthermore, it should be apparent that the particular values used for the connector defining parameters and for the application specific parameters will vary depending on the one hand on the geometry of the connector and on the other hand on the specific application. The specific values used and the manner for determining these values do not form part of this invention, and are therefore not described in any detail here. Those skilled in the art will recognize that suitable values can be obtained either by direct measurement or by computer simulation.

```
1     ****MATRIX ANALYSIS MODEL (M38A8)
2     *******m38.cir*rev d******************
3     ****************************************
4     *COPYRIGHT 1989, BY AMP INCORPORATED*
5     ALL INTERNATIONAL RIGHTS RESERVED
6     ****************************************
7     *HDI 3 ROW CONNECTOR
```

```
8   *THREE ROW X EIGHT COLUMN MODEL
9   *MATRIX REV. D
10  *FILE  MD38A8.CIR
11  *2:1 S/R RATIO
12  *PATTERN M38A8
13  *60 OHM TERMINATION, ALL LINES
14  *3 NS Tr, 1 VOLT EXCITATION
15  *0.5 PF PTH'S, ALL LINES
16  *DRIVE ON LINE(S) A6,A8,B5,B6,
17  *B7,B8,C5,C7
18  *MONITOR QUIET LINE(S) A2,B2,B4
19  *MONITOR DRIVEN LINE(S) B4
20  *RECEIVE REF ISOLATED (V4000)
21  *******************************
22  **** excitation ****************
23  *B5************************
24  *pulse(v1 v2 delay Tr Tf pw period)
25  VS01 01 00 PULSE(2.0 4.0 0 3.0NS)
26  *source impedance
27  RS01 01 1205 60
28  *A6************************
29  *pulse(v1 v2 delay Tr Tf pw period)
30  VS02 02 00 PULSE(2.0 4.0 0 3.0NS)
31  *source impedance
32  RS02 02 1106 60
33  *A8************************
34  *pulse(v1 v2 delay Tr Tf pw period)
35  VS03 03 00 PULSE(2.0 4.0 0 3.0NS)
36  *source impedance
37  RS03 03 1108 60
38  *B6************************
39  *pulse(v1 v2 delay Tr Tf pw period)
40  VS04 04 00 PULSE(2.0 4.0 0 3.0NS)
41  *source impedance
42  RS04 04 1206 60
43  *B7************************
44  *pulse(v1 v2 delay Tr Tf pw period)
45  VS05 05 00 PULSE(2.0 4.0 0 3.0NS)
46  *source impedance
47  RS05 05 1207 60
48  *B8************************
49  *pulse(v1 v2 delay Tr Tf pw period)
50  VS06 06 00 PULSE(2.0 4.0 0 3.0NS)
51  *source impedance
52  RS06 06 1208 60
53  *C5************************
54  *pulse(v1 v2 delay Tr Tf pw period)
55  VS07 07 00 PULSE(2.0 4.0 0 3.0NS)
56  *source impedance
57  RS07 07 1305 60
58  *C7************************
59  *pulse(v1 v2 delay Tr Tf pw period)
60  VS08 08 00 PULSE(2.0 4.0 0 3.0NS)
61  *source impedance
62  RS08 08 1307 60
63  *******************************
64  ****input/output instructions*******
65  .WIDTH IN=80 OUT=80
66  ***DRIVEN LINE(S)
```

```
67   .PRINT TRAN I(VS01)
68   .PRINT TRAN V(1205) V(3205)
69   ***QUIET LINE(S)
70   .PRINT TRAN V(1102) V(3102)
71   .PRINT TRAN V(1202) V(3202)
72   .PRINT TRAN V(1204) V(3204)
73   ***RECEIVING END REFERENCE
74   .PRINT TRAN V(4000)
75   ******************************
76   ******analysis & control*************
77   * ....incr. dur.
78   .TRAN 50PS 5NS
79   .OPTIONS ITL5=0
80   ******************************
81   *referencing*************
82   *send side*******
83   RR1101 1101 0000 1E-6
84   RR1103 1103 0000 1E-6
85   RR1105 1105 0000 1E-6
86   RR1107 1107 0000 1E-6
87   *
88   RR1302 1302 0000 1E-6
89   RR1304 1304 0000 1E-6
90   RR1306 1306 0000 1E-6
91   RR1308 1308 0000 1E-6
92   *
93   *receive side****
94   RR3101 3101 4000 1E-6
95   RR3103 3103 4000 1E-6
96   RR3105 3105 4000 1E-6
97   RR3107 3107 4000 1E-6
98   *
99   RR3302 3302 4000 1E-6
100  RR3304 3304 4000 1E-6
101  RR3306 3306 4000 1E-6
102  RR3308 3308 4000 1E-6
103  *
104  ******************************
105  *******terminations*********
106  *send side*****
107  RT1102 1102 0000 60
108  RT1104 1104 0000 60
109  *RT1106 1106 0000 60
110  *RT1108 1108 0000 60
111  *
112  RT1201 1201 0000 60
113  RT1202 1202 0000 60
114  RT1203 1203 0000 60
115  RT1204 1204 0000 60
116  *RT1205 1205 0000 60
117  *RT1206 1206 0000 60
118  *RT1207 1207 0000 60
119  *RT1208 1208 0000 60
120  *
121  RT1301 1301 0000 60
122  RT1303 1303 0000 60
123  *RT1305 1305 0000 60
124  *RT1307 1307 0000 60
125  *
```

```
126  *receive side**
127  RT3102 3102 4000 60
128  RT3104 3104 4000 60
129  RT3106 3106 4000 60
130  RT3108 3108 4000 60
131  *
132  RT3201 3201 4000 60
133  RT3202 3202 4000 60
134  RT3203 3203 4000 60
135  RT3204 3204 4000 60
136  RT3205 3205 4000 60
137  RT3206 3206 4000 60
138  RT3207 3207 4000 60
139  RT3208 3208 4000 60
140  *
141  RT3301 3301 4000 60
142  RT3303 3303 4000 60
143  RT3305 3305 4000 60
144  RT3307 3307 4000 60
145  *
146  ******************************
147  ******PTH CAP*****************
148  ****example statement********
149  *send side***************
150  CP1102 1102 0000 0.5E-12
151  CP1104 1104 0000 0.5E-12
152  CP1106 1106 0000 0.5E-12
153  CP1108 1108 0000 0.5E-12
154  *
155  CP1201 1201 0000 0.5E-12
156  CP1202 1202 0000 0.5E-12
157  CP1203 1203 0000 0.5E-12
158  CP1204 1204 0000 0.5E-12
159  CP1205 1205 0000 0.5E-12
160  CP1206 1206 0000 0.5E-12
161  CP1207 1207 0000 0.5E-12
162  CP1208 1208 0000 0.5E-12
163  *
164  CP1301 1301 0000 0.5E-12
165  CP1303 1303 0000 0.5E-12
166  CP1305 1305 0000 0.5E-12
167  CP1307 1307 0000 0.5E-12
168  *
169  *receive side*********
170  CP3102 3102 4000 0.5E-12
171  CP3104 3104 4000 0.5E-12
172  CP3106 3106 4000 0.5E-12
173  CP3108 3108 4000 0.5E-12
174  *
175  CP3201 3201 4000 0.5E-12
176  CP3202 3202 4000 0.5E-12
177  CP3203 3203 4000 0.5E-12
178  CP3204 3204 4000 0.5E-12
179  CP3205 3205 4000 0.5E-12
180  CP3206 3206 4000 0.5E-12
181  CP3207 3207 4000 0.5E-12
182  CP3208 3208 4000 0.5E-12
183  *
184  CP3301 3301 4000 0.5E-12
185  CP3303 3303 4000 0.5E-12
```

```
186  CP3305 3305 4000 0.5E-12
187  CP3307 3307 4000 0.5E-12
188  *
189  ******************************
190  *****CONNECTOR MODEL*******
191  *****m38.bcm*rev d*********
192  ******************************
193  ****SERIES ELEMENTS****
194  **m38.mserev d******
195  *ROW A**************
196  RC1101 1101 2101 4E-3
197  LC2101 2101 3101 10E-9
198  *
199  RC1102 1102 2102 4E-3
200  LC2102 2102 3102 10E-9
201  *
202  RC1103 1103 2103 4E-3
203  LC2103 2103 3103 10E-9
204  *
205  RC1104 1104 2104 4E-3
206  LC2104 2104 3104 10E-9
207  *
208  RC1105 1105 2105 4E-3
209  LC2105 2105 3105 10E-9
210  *
211  RC1106 1106 2106 4E-3
212  LC2106 2106 3106 10E-9
213  *
214  RC1107 1107 2107 4E-3
215  LC2107 2107 3107 10E-9
216  *
217  RC1108 1108 2108 4E-3
218  LC2108 2108 3108 10E-9
219  *
220  *ROW B************
221  *
222  RC1201 1201 2201 5E-3
223  LC2201 2201 3201 13E-9
224  *
225  RC1202 1202 2202 5E-3
226  LC2202 2202 3202 13E-9
227  *
228  RC1203 1203 2203 5E-3
229  LC2203 2203 3203 13E-9
230  *
231  RC1204 1204 2204 5E-3
232  LC2204 2204 3204 13E-9
233  *
234  RC1205 1205 2205 5E-3
235  LC2205 2205 3205 13E-9
236  *
237  RC1206 1206 2206 5E-3
238  LC2206 2206 3206 13E-9
239  *
240  RC1207 1207 2207 5E-3
241  LC2207 2207 3207 13E-9
242  *
243  RC1208 1208 2208 5E-3
244  LC2208 2208 3208 13E-9
245  *
```

```
246  *ROW C***********
247  *
248  RC1301 1301 2301 6E-3
249  LC2301 2301 3301 16E-9
250  *
251  RC1302 1302 2302 6E-3
252  LC2302 2302 3302 16E-9
253  *
254  RC1303 1303 2303 6E-3
255  LC2303 2303 3303 16E-9
256  *
257  RC1304 1304 2304 6E-3
258  LC2304 2304 3304 16E-9
259  *
260  RC1305 1305 2305 6E-3
261  LC2305 2305 3305 16E-9
262  *
263  RC1306 1306 2306 6E-3
264  LC2306 2306 3306 16E-9
265  *
266  RC1307 1307 2307 6E-3
267  LC2307 2307 3307 16E-9
268  *
269  RC1308 1308 2308 6E-3
270  LC2308 2308 3308 16E-9
271  *
272  *****************************
273  ****CAPACITIVE MATRIX*****
274  **m38.cmerev d********
275  *ROW A****************
276  CV2101 2101 2201 0.39E-12
277  CH2101 2101 2102 0.45E-12
278  CR2101 2101 2202 0.20E-12
279  *
280  CV2102 2102 2202 0.39E-12
281  CH2102 2102 2103 0.45E-12
282  CR2102 2102 2203 0.20E-12
283  CL2102 2102 2201 0.20E-12
284  *
285  CV2103 2103 2203 0.39E-12
286  CH2103 2103 2104 0.45E-12
287  CR2103 2103 2204 0.20E-12
288  CL2103 2103 2202 0.20E-12
289  *
290  CV2104 2104 2204 0.39E-12
291  CH2104 2104 2105 0.45E-12
292  CR2104 2104 2205 0.20E-12
293  CL2104 2104 2203 0.20E-12
294  *
295  CV2105 2105 2205 0.39E-12
296  CH2105 2105 2106 0.45E-12
297  CR2105 2105 2206 0.20E-12
298  CL2105 2105 2204 0.20E-12
299  *
300  CV2106 2106 2206 0.39E-12
301  CH2106 2106 2107 0.45E-12
302  CR2106 2106 2207 0.20E-12
303  CL2106 2106 2205 0.20E-12
304  *
```

```
305  CV2107 2107 2207 0.39E-12
306  CH2107 2107 2108 0.45E-12
307  CR2107 2107 2208 0.20E-12
308  CL2107 2107 2206 0.20E-12
309  *
310  CV2108 2108 2208 0.39E-12
311  CL2108 2108 2207 0.20E-12
312  *
313  *ROW B**************
314  CV2201 2201 2301 0.40E-12
315  CH2201 2201 2202 0.45E-12
316  CR2201 2201 2302 0.20E-12
317  *
318  CV2202 2202 2302 0.40E-12
319  CH2202 2202 2203 0.45E-12
320  CR2202 2202 2303 0.20E-12
321  CL2202 2202 2301 0.20E-12
322  *
323  CV2203 2203 2303 0.40E-12
324  CH2203 2203 2204 0.45E-12
325  CR2203 2203 2304 0.20E-12
326  CL2203 2203 2302 0.20E-12
327  *
328  CV2204 2204 2304 0.40E-12
329  CH2204 2204 2205 0.45E-12
330  CR2204 2204 2305 0.20E-12
331  CL2204 2204 2303 0.20E-12
332  *
333  CV2205 2205 2305 0.40E-12
334  CH2205 2205 2206 0.45E-12
335  CR2205 2205 2306 0.20E-12
336  CL2205 2205 2304 0.20E-12
337  *
338  CV2206 2206 2306 0.40E-12
339  CH2206 2206 2207 0.45E-12
340  CR2206 2206 2307 0.20E-12
341  CL2206 2206 2305 0.20E-12
342  *
343  CV2207 2207 2307 0.40E-12
344  CH2207 2207 2208 0.45E-12
345  CR2207 2207 2308 0.20E-12
346  CL2207 2207 2306 0.20E-12
347  *
348  CV2208 2208 2308 0.40E-12
349  CL2208 2208 2307 0.20E-12
350  *
351  *ROW C**************
352  CH2301 2301 2302 0.65E-12
353  *
354  CH2302 2302 2303 0.65E-12
355  *
356  CH2303 2303 2304 0.65E-12
357  *
358  CH2304 2304 2305 0.65E-12
359  *
360  CH2305 2305 2306 0.65E-12
361  *
362  CH2306 2306 2307 0.65E-12
363  *
```

```
364  CH2307 2307 2308 0.65E-12
365  *
366  ****************************
367  ******KL MATRIX***********
368  ******m38.kme*rev d*****
369  *ROW A***************
370  KV2101 LC2101 LC2201 .18
371  KH2101 LC2101 LC2102 .22
372  KR2101 LC2101 LC2202 .10
373  *
374  KV2102 LC2102 LC2202 .18
375  KH2102 LC2102 LC2103 .22
376  KR2102 LC2102 LC2203 .10
377  KL2102 LC2102 LC2201 .10
378  *
379  KV2103 LC2103 LC2203 .18
380  KH2103 LC2103 LC2104 .22
381  KR2103 LC2103 LC2204 .10
382  KL2103 LC2103 LC2202 .10
383  *
384  KV2104 LC2104 LC2204 .18
385  KH2104 LC2104 LC2105 .22
386  KR2104 LC2104 LC2205 .10
387  KL2104 LC2104 LC2203 .10
388  *
389  KV2105 LC2105 LC2205 .18
390  KH2105 LC2105 LC2106 .22
391  KR2105 LC2105 LC2206 .10
392  KL2105 LC2105 LC2204 .10
393  *
394  KV2106 LC2106 LC2206 .18
395  KH2106 LC2106 LC2107 .22
396  KR2106 LC2106 LC2207 .10
397  KL2106 LC2106 LC2205 .10
398  *
399  KV2107 LC2107 LC2207 .18
400  KH2107 LC2107 LC2108 .22
401  KR2107 LC2107 LC2208 .10
402  KL2107 LC2107 LC2206 .10
403  *
404  KV2108 LC2108 LC2208 .18
405  KL2108 LC2108 LC2207 .10
406  *
407  *ROW B***************
408  KV2201 LC2201 LC2301 .13
409  KH2201 LC2201 LC2202 .14
410  KR2201 LC2201 LC2302 .06
411  *
412  KV2202 LC2202 LC2302 .13
413  KH2202 LC2202 LC2203 .14
414  KR2202 LC2202 LC2303 .06
415  KL2202 LC2202 LC2301 .06
416  *
417  KV2203 LC2203 LC2303 .13
418  KH2203 LC2203 LC2204 .14
419  KR2203 LC2203 LC2304 .06
420  KL2203 LC2203 LC2302 .06
421  *
```

```
422  KV2204  LC2204  LC2304  .13
423  KH2204  LC2204  LC2205  .14
424  KR2204  LC2204  LC2305  .06
425  KL2204  LC2204  LC2303  .06
426  *
427  KV2205  LC2205  LC2305  .13
428  KH2205  LC2205  LC2206  .14
429  KR2205  LC2205  LC2306  .06
430  KL2205  LC2205  LC2304  .06
431  *
432  KV2206  LC2206  LC2306  .13
433  KH2206  LC2206  LC2207  .14
434  KR2206  LC2206  LC2307  .06
435  KL2206  LC2206  LC2305  .06
436  *
437  KV2207  LC2207  LC2307  .13
438  KH2207  LC2207  LC2208  .14
439  KR2207  LC2207  LC2308  .06
440  KL2207  LC2207  LC2306  .06
441  *
442  KV2208  LC2208  LC2308  .13
443  KL2208  LC2208  LC2307  .06
444  *
445  *ROW C*************
446  KH2301  LC2301  LC2302  .25
447  *
448  KH2302  LC2302  LC2303  .25
449  *
450  KH2303  LC2303  LC2304  .25
451  *
452  KH2304  LC2304  LC2305  .25
453  *
454  KH2305  LC2305  LC2306  .25
455  *
456  KH2306  LC2306  LC2307  .25
457  *
458  KH2307  LC2307  LC2308  .25
459  *
460  ********************************
461  .END
```

I claim:

1. A method for allocating a plurality of signals to specific signal carrying paths of an electrical connector, comprising the following steps:

a) providing a computer system for modelling an electrical connector, said system comprising a computer and a computer implemented model for an electrical connector having a plurality of signal carrying paths, said model comprising a first set of stored, preselected, connector defining parameters which define a fixed geometry characteristic of the electrical connector and a second set of user-selectable, application specific parameters which define a plurality of signals applied to the signal carrying paths, said computer model arranged to execute on the computer;

b) selecting the second set of application specific parameters to define an initial set of signals applied to the signal carrying paths;

c) executing the computer model to determine expected effects of the electrical connector on at least some of the initial set of signals;

d) selecting the second set of application specific parameters to define another set of signals applied to the signal carrying paths;

e) executing the computer model to determine expected effects of the electrical connector on at least some of the other set of signals defined in step (d); and f) assigning a physical allocation of one of the initial and the other sets of signals to respective signal carrying paths of the electrical connector after comparing the expected effects of the electrical connector on at least some of the associated signals in steps (c) and (e) as an aid to optimizing signal allocation to selected signal carrying paths of the connector.

2. The method of claim 1 wherein the initial and other sets of signals comprise the same signals, and wherein at least some of the signals of the initial set are allocation to difference signal carrying paths in the respective sets.

3. The method of claim 1 wherein the plurality of pre-selected connector defining parameters comprise a plurality of series constants each indicative of at least a portion of an equivalent circuit for each of the signal carrying paths.

4. The method of claim 3 wherein the plurality of pre-selected connector defining parameters additionally comprise a capacitive matrix comprising a plurality of capacitive elements, each indicative of a capacitive coupling constant for a respective pair of the signal carrying paths.

5. The method of claim 3 wherein the plurality of pre-selected connector defining parameters additionally comprise an inductive matrix comprising a plurality of inductive elements, each indicative of a mutual inductance constant for a respective pair of the signal carrying paths.

6. A method for allocating a plurality of signals to specific signal carrying paths of an electrical connector, said method comprising the following steps:

a) providing a connector simulator for simulating an electrical connector having a plurality of signal carrying paths, said simulator comprising a first set of stored, preselected, connector defining parameters which define a fixed geometry characteristic of the electrical connector and a second set of user-selectable, application specific parameters which define a plurality of signals applied to the signal carrying paths, said simulator operative to simulate on a computer and to generate an output indicative of changes in at least some of the signals in the electrical connector, including changes in said at least some of the signals causing by electrical influences of the signals on one another;

b) selecting the second set of application specific parameters to define an initial set of signals applied to a first pattern to the signal carrying paths, wherein the initial set of signals comprises reference potential signals and active signals and allocates the reference potential signals and the active signals in said first pattern to respective selected ones of the signal carrying paths;

c) using the simulator to produce a first output indicative of expected effects of the electrical connector and the associated signals on at least some of the initial set of signals;

d) revising the second set of application specific parameters to re-allocate at least some of the initial set of signals to different selected ones of the signal carrying paths in a second pattern;

e) using the simulator to produce a second output indicative of expected effects of the electrical connector and the associated signals on at least some of the initial set of signals as re-allocated in step d); and f) assigning a physical allocation of the initial set of signals to respective signal carrying paths of the electrical connector in correspondence with one of the first and second patterns after comparing the first and second outputs obtained in steps c) and e) as an aid to optimizing allocation of the reference and active signals to selected signal carrying paths of the connector.

7. The method of claim 6 wherein the application specific parameters of steps (b) and (d) define the same signals, and wherein the application specific parameters of step (d) reallocate at least some of the signals to different signal carrying paths than do the application specific parameters of step (b).

* * * * *